United States Patent [19]

Hayakawa et al.

[11] 4,116,255
[45] Sep. 26, 1978

[54] FOLDABLE PNEUMATIC TIRE

[75] Inventors: Hiroshi Hayakawa, Kodaira; Sakae Ezura, Matsudo, both of Japan

[73] Assignee: Bridgestone Tire Company Limited, Tokyo, Japan

[21] Appl. No.: 785,708

[22] Filed: Apr. 7, 1977

[30] Foreign Application Priority Data

Apr. 15, 1976 [JP] Japan .................. 51-41887

[51] Int. Cl.$^2$ .................................. B60C 5/00
[52] U.S. Cl. .................... 152/352 R; 152/353 R
[58] Field of Search ........ 152/330 R, 330 RF, 352 R, 152/352 A, 353 R, 353 C; 425/28 D, 31-33, 35, 43, 46

[56] References Cited

U.S. PATENT DOCUMENTS

| | | | |
|---|---|---|---|
| 3,347,300 | 10/1967 | Sidles | 152/352 R |
| 3,394,750 | 7/1968 | Tatrzycki | 152/330 R |
| 3,540,510 | 11/1970 | Smithkey | 152/352 R |
| 3,570,572 | 3/1971 | Cardenas et al. | 152/330 R |
| 3,833,042 | 9/1974 | Watts | 152/330 R |
| 4,057,091 | 11/1977 | Gardner et al. | 152/353 R |

*Primary Examiner*—Albert J. Makay
*Assistant Examiner*—Carl Rowold
*Attorney, Agent, or Firm*—Sughrue, Rothwell, Mion, Zinn and Macpeak

[57] ABSTRACT

A foldable pneumatic tire including an annular tread and sidewalls each extending from both ends of the tread and terminating in bead portions, the sidewalls adapted to be folded axially inwardly toward each other to be collapsed within the tread. The foldable tire located in a mold for vulcanization comprises the bead portions each extending perpendicular to a rotating axis of the tire and having a height 1.2 to 2.0 times of that of a flange of a rim, and each the sidewall consisting of first and second sidewalls making an angle with each other between 140° and 160°, and an outer surface of the second sidewall radially inwardly sloping at an angle of 0° to 5° to the rotating axis. The tire according to the invention is superior in foldability and can be attached to the rim with ease and is greatly useful for a spare tire for automobiles.

6 Claims, 7 Drawing Figures

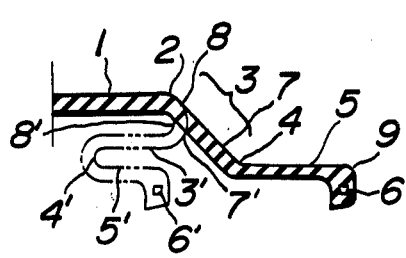
FIG._4
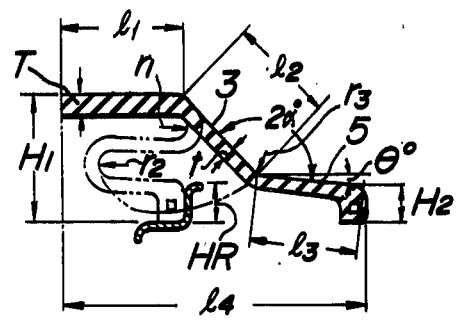
FIG._5
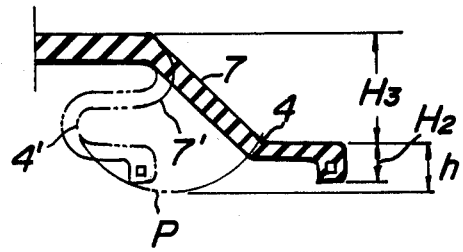
FIG._6
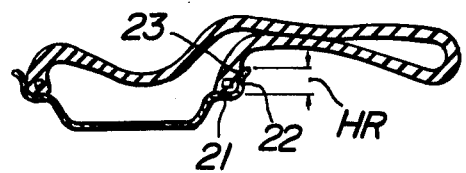
FIG._7
PRIOR ART

FOLDABLE PNEUMATIC TIRE

BACKGROUND OF THE INVENTION

1. Field of the Invention

The present invention relates to a foldable pneumatic tire mainly used for a spare tire for vehicles such as automobiles.

2. Description of the Prior Art:

A foldable tire generally has foldable sidewalls. Such a tire has substantially the same dimension as in a normal tire when in use, but can be collapsed into a very small dimension so as to be housed in a spare housing when in an unused or deflated condition. Such tires have been known as disclosed in U.S. Pat. No. 3,347,300 and Japanese Patent Application Publication No. 35,957/75.

The tire disclosed in the U.S. Pat. No. 3,347,300 is molded and vulcanized in a mold whose cavity corresponds to that of the deflated or collapsed tire. In order to vulcanize the tire in the collapsed shape, a corresponding particularly shaped mold is used and bagless vulcanization is employed wherein the vulcanizing heat medium should be directly in contact with the tire to be vulcanized. Therefore, the tires according to the U.S. Pat. No. 3,347,300 require extensive modification of existing apparatuses and installations. Furthermore bagless vulcanization is generally prone to produce inferior tires that are rejected.

The Japanese Patent Application Publication No. 35,957/75 dicloses a foldable tire produced by existing apparatuses and installations used for normal tires requiring only a mold particular in shape without using any special equipment and methods. However, when vulcanized, there is a tendency for rubber material of a bent portion of a sidewall of the tire to be withdrawn into both sides thereof so as to become much thinner. In order to maintain the bent portion of the tire at a determined thickness, it is required to make thicker the sidewalls and rim cushions. However, thicker rim cushions of tire make it difficult to fit the tire onto the rim. In addition, the bent portion of the tire disclosed in the Publication makes it difficult to separate the tire from the vulcanizing mold when taking the vulcanized tire out of the mold after vulcanization and thus to decrease the productivity of tires considerably U.S. Pat. No. 3,540,510 discloses a foldable tire produced by a method similar to that of the Japanese Patent Application Publication No. 35,957/75. In the tire disclosed in this U.S. Patent, a difference in thickness between the tread and rim cushion is present, so that the tire has less foldability and is difficult in rim assembly and hence very much inferior as an article to be produced.

SUMMARY OF THE INVENTION

It is therefore a general object of this invention to provide a foldable pneumatic tire which overcomes the above problems of the prior art tires.

It is more specific object of this invention to provide a foldable pneumatic tire having the same dimension when inflated as that of a normal tire and an outer diameter and a width as small as possible when deflated, capable of easily returning from an inflated position to a folded or collapsed position when deflated or having a high foldability, and able to be produced by the use of existing apparatus and installations without any significant modification and equal in productivity to normal tires without producing inferior tires.

The foldable pneumatic tire according to the present invention includes a substantially annular tread centrally located and sidewalls extending from both ends of said tread and terminating in inextensible bead portions. The sidewalls are foldable axially inwardly toward each other to be collapsed substantially inside said tread and when located in a mold for vulcanization, the bead portions each extend substantially perpendicular to a rotating axis of the tire and having a height 1.2 to 2.0 times of that of a flange of a rim. Each sidewall consists of first and second sidewalls making an angle with each other between 140° and 160°, and an outer surface of said second sidewall radially inwardly sloping at an angle of 0 to 5° to the rotating axis.

BRIEF DESCRIPTION OF THE DRAWING

These and other objects, features and advantages of the invention will become more apparent upon a reading of the following detailed specification and drawing, in which:

FIG. 4 is a sectional view of one half of the tire according to the invention after vulcanization, showing a position in a mold in solid lines and a folded or collapsed position in phantom lines;

FIGS. 5 and 6 are explanatory sectional views similar to FIG. 4 showing conditions of the tire in the mold, respectively; and FIG. 7 is an explanatory sectional view of a tire according to a prior art wherein it has not properly returned from its inflated position to its deflated position.

DESCRIPTION OF THE PREFERRED EMBODIMENTS

A foldable pneumatic tire generally has foldable sidewalls. It has substantially the same dimension as in a normal pneumatic tire when in use, but can be collapsed into a very small dimension so as to be housed in a spare housing when in an unused or deflated condition. Such tires have been known as disclosed in the above discussed U.S. Pat. No. 3,347,300 and Japanese Patent Application Publication No. 35,957/75.

Figure 1:
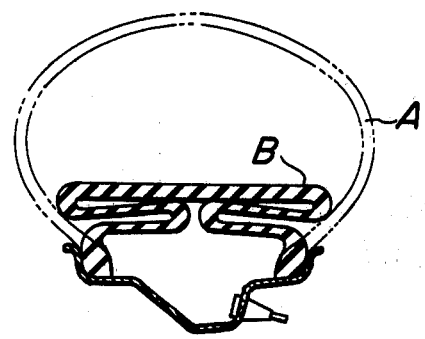
FIG. 1 is a sectional view of a foldable tire attached to a rim, showing a folded or collapsed position in solid lines and an inflated position in phantom lines.

The tires disclosed in these patents are substantially similar to each other as shown in FIG. 1 in configurations A in phantom lines when inflated and B in solid lines when deflated, but are different in mold configurations and vulcanizing methods.

The tire disclosed in the U.S. Pat. No. 3,347,300 is molded and vulcanized in a mold whose cavity corresponds substantially to that of the tire attached to a rim and deflated or collapsed as shown in FIG. 1. In order to vulcanize the tire in the collapsed shape it is required to use a correspondingly particularly shaped mold and to employ bagless vulcanization wherein the vulcanizing heat medium should be directly in contact with the tire to be vulcanized because the vulcanization with the commonly known bladders is difficult for thus molded tire in a folded condition. Therefore, the tires according to the U.S. Pat. No. 3,347,300 require extensive modification of existing apparatuses and installations. Furthermore, the bagless vulcanization is generally prone to produce inferior products that must be rejected.

Figure 2:
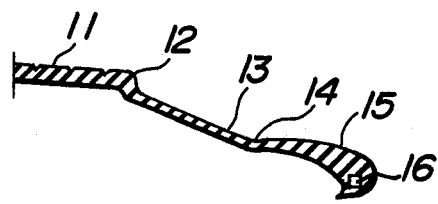
FIG. 2 is a sectional view of one half of a tire produced according to a prior art.

Japanese Patent Application Publication No. 35,957/75 discloses a foldable tire to be produced by existing apparatuses and installations used for normal tires only required a mold particular in shape without using any special equipment and method. FIG. 2 illustrates a partial section of the tire produced by the method disclosed in the Japanese Patent Application Publication. As can be seen from FIG. 2, a sidewall portion 13 of the cavity of the mold consists of a slope portion adjacent to a shoulder portion 12 or straight portion or slightly bulged toward the outside of the tire, and tire bent portion 14 raised inwardly, from which extends a rim cushion 15 thicker toward the outside of the tire and terminates in a bead portion 16. With this arrangement, the tire bent portion between the sidewall portion and rim cushion circumferentially forms a ridge in the cavity of the mold, so that when vulcanized and formed, the rubber material in the bent portion is withdrawn into both sides thereof so as to become much thinner. In order to maintain the bent portion of the tire to be in a determined thickness, the sidewalls and rim cushions must be made thicker. However, thicker rim cushions of tire make it difficult to fit the tire onto the rim to reduce the rim assembly performance considerably. It has been found that there is a tendency for defects in tires to occur in the bent portion. In addition, the bent portion of the tire disclosed in the Publication makes it difficult to separate the tire from the vulcanizing mold when taking the vulcanized tire out of the mold after vulcanization and thus decreases the productivity of tires considerably.

Figure 3:
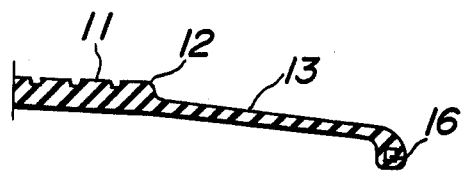
FIG. 3 is a sectional view of one half of a tire produced according to another prior art.

U.S. Pat. No. 3,540,510 discloses a foldable pneumatic tire produced by a method similar to that of Japanese Patent Application Publication No. 35,957/75, which is shown in section in FIG. 3. In the tire disclosed in this Patent, the difference in thickness between the tread and rim cushion is small, so that the tire has much less foldability and less rim assembly performance and hence is very much inferior as an article to be produced.

The tire according to the present invention in a mold has a configuration, half of which is shown in solid lines in FIG. 4, which consists of a tread 1 having a flat surface in section, a sidewall comprising first and second sidewalls 3 and 5, and bead portion 6 extending substantially radial or perpendicular to an axis of the tire. The tread 1 includes shoulders 2 each for connecting a tread end and the first sidewall 3. The first and second sidewalls 3 and 5 are connected by a second bent portion 4 in the form of an arc having a radius $r_3$.

The first sidewall 3 in section slopes outwardly downwardly as viewed in FIG. 5 from the shoulder 2 towards the rotating axis of the tire. The second sidewall 5 in section extends from the second bent portion 4 outwardly and slightly toward the axis of the tire to form an angle 0° to 5° with the axis of the tire and terminates in the bead 6.

The thus molded and vulcanized tire is then folded into a shape as shown in phantom lines in FIG. 4. The bead portions 6 of the vulcanized tire can be easily shifted toward the center of the tire or immediately below the tread 1 to obtain the folded or collapsed tire by means of a machine such as a PCI (post cure inflation) machine hitherto used without any modification of the machine. In the folded position, the second bent portions 4 have been shifted toward the concentric inside of the tread 1. With this arrangement according to the present invention it has been found that the zone 8 extending from the shoulder 2 to a point 7 on the first sidewall spaced therefrom 30 to 40 mm turns into a first bent portion 8' when the bead portions 6 is shifted toward the center of the tire without requiring any particular consideration for forming the first bent portion 8.

The tire of this type has the same configuration as that of a normal tire when inflated, while it is capable of returning to its folded position when deflated. Such a returning to the original configuration is caused by the fact that cord angles of cord layers included in the tire are different between inflated and deflated positions. The inventors of this application have found that in case of a tire having a carcass ply consisting of two laminated rubber coated textile cord layers whose cords cross or intersect to each other, the cord angles 60° of the cord layer in the tread relative to an equatorial line of the tire when folded may change up to 40° when inflated. These angles return again to the 60° when deflated. These angles are preferably 50° to 60° in most cases. The change in angle of cords causes the foldable tire to return to its original position so as to be housed in a small space. The textile cords for reinforcing the carcass layer may be such as rayon, nylon, polyester and the like. Results of experiments indicate that polyester is preferable.

It is, however, very difficult to make the tire in complete symmetry in construction when produced, resulting in different restoring characteristics on both sides of the equatorial line of the tire. Therefore there is a tendency for the tire to be folded or collapsed in asymmetry as shown in FIG. 7.

In order for the tire to be folded or collapsed in complete symmetry without being folded in asymmetry, a relation between the beads of the tire and the flanges of a rim should be such that outer surfaces 23 of the beads of the tire are returned back by insides 22 of the flanges of the rim 21. After many experiments the inventors have found that the height $H_2$ of the bead of the tire must be 1.2 to 2.0 times of the height HR of the flange of a rim to be applied to the tire as shown in FIG. 5. As the height $H_2$ of the bead becomes higher, the effect increases correspondingly. However, the higher $H_2$ necessarily increases the height $H_1$ of the tire when deflated, which must be as small as possible in view of the inherent purpose of the foldable tire. In this respect, the height $H_2$ is preferably 1.6 HR to 1.8 HR.

The second sidewall 5 must be slightly sloped outwardly and towards the rotating axis of the tire as shown at θ° in FIG. 5. A second sidewall raised away from the rotating axis (opposite to the sidewall 5 as shown in FIG. 5) makes it difficult to remove the tire from a tire mold after vulcanization and causes defects in the proximity of the sidewall such as too thin second bent portions 4. To avoid this it is better to slope the sidewall 5 more downwardly to make the angle θ larger. However, the larger angle θ necessarily increases the height $H_1$ of the deflated tire which is not preferable for the foldable tire.

In designing tires, since dimensions of the tires such as diameters and widths are already determined by standards as JIS (Japanese Industrial Standard), TRA, etc., the dimensions of tires to be designed are also determined. Peripheries in section of a mold required to obtain the tires are also determined by the dimensions of the tires. The overall length of the peripheries is twice the sum of those of the tread periphery $l_1$, first sidewall periphery $l_2$ and second sidewall periphery $l_3$. The twice $l_1$ is the tread width which is determined by a designer according to the dimension to be designed. The twice $l_1$ is normally about 65% of the maximum width of the tire when inflated at a normal pressure.

The length of the peripheries of the sidewalls $2(l_2+l_3)$ is the difference between the overall length of the peripheries and the length $2l_1$ of the tread. The length $l_2$ of the first sidewall 3 must be longer by an amount for forming the first bent portion 8 than that $l_3$ of the second sidewall 5. Since the radius $r_1$ of the inside of the first bent portion 8 is most preferably within 5 to 10 mm, the length $l_2$ of the first sidewall must be 1.5 to 2.0 times of that $l_3$ of the second sidewall 5, which is indicated by $l_2=(1.5 \text{ to } 2.0)l_3$. The relation between $l_2$ and $l_3$ is a necessary condition for positioning the beads 6 substantially immediately below the shoulders 2 without affecting the rim assembly performance when folded.

After the tire thus including the peripheries has been molded and vulcanized, the bead portions 6 are shifted inwardly so as to be immediately below the shoulders 2 to form a folded or collapsed tire. During the folding process, the second bent portion 4 describes an arch-shaped locus as shown in phantom lines in FIGS. 5 and 6. As can be seen from the locus, the second bent portion describes an arc having a radius substantially equal to $l_2$ and a center at the shoulder 2 until the second bent portion 4 becomes immediately below the shoulders 2 and then describes an elliptical locus progressively decreasing its radius $l_2$ until the beads 6 reach immediately below the shoulders 2 to complete the folding operation. Accordingly, the locus as a whole is in the form of a lower half of a lying oval having the lowest point P immediately below the shoulder 2.

The important factor for determining the foldability of the tire according to the invention is how far the lowest point P positions vertically below an original bead corner 9 of the second sidewall 5, that is, the distance $h$ in FIG. 6. A distance radially inwardly from the corner 9 is indicated by $+h$ whereas a distance radially outwardly is indicated by $-h$. If the $h$ is zero or minus, the tire is not a foldable tire but a mere normal tire which cannot be folded into a small dimension. As the $h$ becomes larger on plus side, the foldability of the tire becomes correspondingly higher to limit the height $H_1$ of the tire to a small value. As described in the U.S. Pat. No. 3,540,510, however, when the height $H_3$ (FIG. 6) is in the order of 0 to 12 mm, the radii $r_2$ and $r_1$ of insides of the bent portions 4' and 7' become very small, substantially zero because the thickness $t$ of the sidewalls is 5 to 7 mm. Such extremely small radii cause cracks in the bent portions and consequently require a particular folding machine for effecting the folding operation. It has been found that in consideration of the foldability and the height $H_1$ of the tire, the relation between $h$ and $H_2$ should be $h=(1.0 \text{ to } 3.0)H_2$, preferably $h=(1.5 \text{ to } 2.0)H_2$.

On the other hand the most preferable height $H_1$ of the folded tire is indicated as follows in view of production and performance of the tire, where T is the thickness of the tread $l$ and $t$ is the thickness of the side wall.

$$H_1=(1.2 \text{ to } 2.0)H_R+t+2(r_1+r_2)+T$$

The thickness $t$ is in the order of $7\pm1$ mm which will be determined by reinforcing cords of carcass ply. The thickness T is in the order of $13\pm2$ mm which will be determined by an expected span life of the tire due to wear. The radii $r_1$ and $r_2$ are preferably 5–10 mm because too small radii cause cracks in the bent portions.

Referring to FIG. 5 and the above description, following relations can be obtained, as the angle $\theta$ is negligible.

$$H_1-H_2=2(r_1+r_2)+t+T=l_2\sin(180°-2\alpha)$$

or $$2\alpha = 180° - \sin^{-1}[\frac{H_1 - H_2}{l_2}]$$

On the other hand, by substituting for the following relations in the $2\alpha$, the relation between $\alpha$ and HR is obtained.

$$l_2=2(r_1+r_2)+t+T+(1.5 \text{ to } 2.0)H_2$$

$$H_2=(1.2 \text{ to } 2.0)H_R$$

$$2\alpha = 180° - \sin^{-1}[\frac{2(r_1+r_2)+t+T}{2(r_1+r_2)+t+T+(2.4 \text{ to } 3.6)H_R}]$$

The dimension of HR is determined by the standard, for example, HR=17.5 mm of 5–J×14 rim of a tire C78-14 according to JIS. In view of these points, $2\alpha$ is within 120° to 160°, preferably 140° to 160°.

As can be seen from the above description, the tire according to the present invention is specified in the configuration of the beads in a mold, the angle made by the first and second sidewalls and the configuration of the second sidewall and it can be produced by the use of existing apparatuses and installations without any significant modification thereof to prevent the second bent portions from becoming too thin which would otherwise occur in the prior art, and to make it easy to remove the tire from the mold after vulcanization. Very few inferior products to be rejected are produced. The tire according to the invention is superior in foldability and rim assembly performance and is greatly useful for a spare tire for automobiles.

It is understood by those skilled in the art that the foregoing description is a preferred embodiment of the disclosed tire and that various changes and modifications may be made in the invention without departing from the spirit and scope thereof.

What is claimed is:

1. In a foldable pneumatic tire including a substantially annular tread centrally located and sidewalls axially outwardly extending with slopes toward a rotating axis of the tire from both ends of said tread and terminating in inextensible bead portions, respectively, said sidewalls being foldable axially inwardly toward each other to be collapsed substantially inside said tread, the improvement comprising, when the tire is in an unfolded condition, each of said bead portions extends substantially perpendicular to the rotating axis and has a height 1.2 to 2.0 times of that of a flange of a rim, each said sidewall comprising a first sidewall axially inside and a second sidewall axially outside making an angle with each other in the range of 140° to 160°, and said second sidewall forming a substantially flat outer surface sloping at an angle not greater than 5° to the rotating axis.

2. A tire as set forth in claim 1, wherein a periphery of said first sidewall is longer than that of said second sidewall in a radial cross-section.

3. A tire as set forth in claim 2, wherein said periphery of said first sidewall is 1.5 to 2.0 times of that of said second sidewall in a radial cross-section.

4. A tire as set forth in claim 1, wherein said height of the bead portions is within 1.6 to 1.8 times of the height of said flange of the rim.

5. A tire as set forth in claim 1, wherein said tire comprises a carcass ply consisting of two laminated rubber coated textile cord layers whose cords intersect to each other and are at angles approximately 50° to 60° relative to an equatorial line of the tire.

6. A tire as set forth in claim 5, wherein textile cords of said rubber coated textile cord layers are made of polyester.

* * * * *